(12) United States Patent
Han et al.

(10) Patent No.: US 12,627,242 B2
(45) Date of Patent: May 12, 2026

(54) TECHNIQUES FOR TRANSITIONING BETWEEN CONTROL MODES OF AN ACTIVE FRONT END UNIT

(71) Applicant: Caterpillar Inc., Peoria, IL (US)

(72) Inventors: Seok-hee Han, Dunlap, IL (US); Jesse R. Gerdes, Dunlap, IL (US); Jackson Wai, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 876 days.

(21) Appl. No.: 17/901,509

(22) Filed: Sep. 1, 2022

(65) Prior Publication Data

US 2024/0079870 A1　　Mar. 7, 2024

(51) Int. Cl.
　　 *H02M 7/537*　　　(2006.01)
　　 *H02J 3/38*　　　　(2006.01)
　　 *H02M 1/00*　　　(2006.01)

(52) U.S. Cl.
　　 CPC ............... *H02M 7/537* (2013.01); *H02J 3/38* (2013.01); *H02M 1/0003* (2021.05)

(58) Field of Classification Search
　　 CPC ......... H02M 7/537; H02M 1/0003; H02J 3/38
　　 See application file for complete search history.

(56) References Cited

U.S. PATENT DOCUMENTS

| | | | |
|---|---|---|---|
| 6,119,063 A | 9/2000 | Hieb et al. | |
| 6,316,920 B1 * | 11/2001 | Huggett | G05F 1/70 |
| | | | 323/207 |
| 6,385,527 B1 | 5/2002 | Zumberge et al. | |
| 8,994,202 B2 | 3/2015 | Gupta et al. | |
| 9,893,523 B2 | 2/2018 | Chen et al. | |
| 2011/0248569 A1 | 10/2011 | Son et al. | |
| 2016/0226368 A1 * | 8/2016 | Al-Hokayem | H02P 21/30 |
| 2016/0329714 A1 * | 11/2016 | Li | H02M 1/42 |

FOREIGN PATENT DOCUMENTS

| | | |
|---|---|---|
| CN | 102109822 | 6/2011 |
| CN | 108233387 | 6/2018 |
| DE | 102016012352 | 4/2018 |
| JP | 2021122724 | 8/2021 |
| WO | 2021122724 | 6/2021 |

* cited by examiner

*Primary Examiner* — Harry R Behm

(57) ABSTRACT

Techniques to reduce discontinuities in power, for example, by controlling an electrical power output of an active front end unit during a transition between a first operating mode and a second operating mode. In some examples, to reduce discontinuities, a control unit of the active front end unit can seed the integrator of proportional-integral (PI) controllers that are brought online during the operating mode change with a value that represents the proper state of the current system, such as the measured or calculated value of the component the PI controller is controlling). In other examples, to reduce discontinuities, a control unit of the active front end unit can control reference frame alignment during a transition between a first operating mode and a second operating mode.

16 Claims, 5 Drawing Sheets

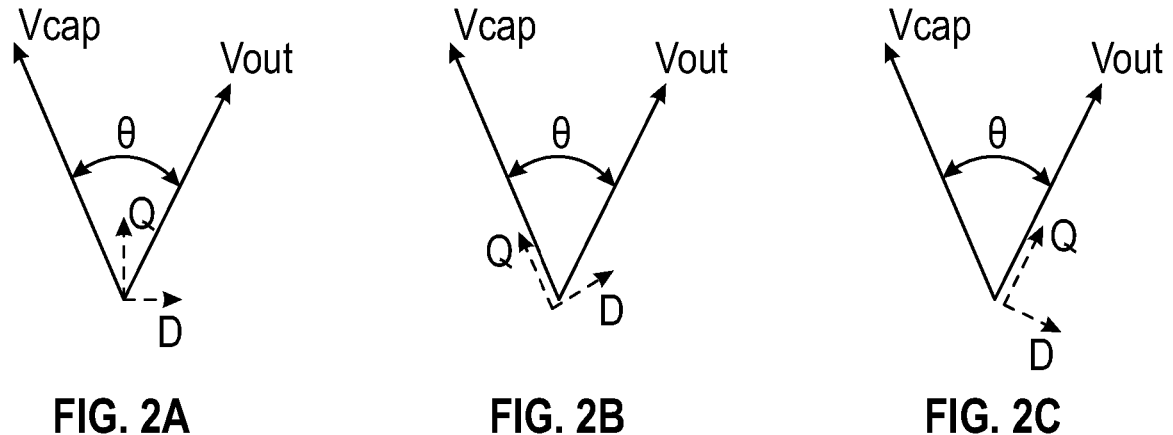
FIG. 2A          FIG. 2B          FIG. 2C
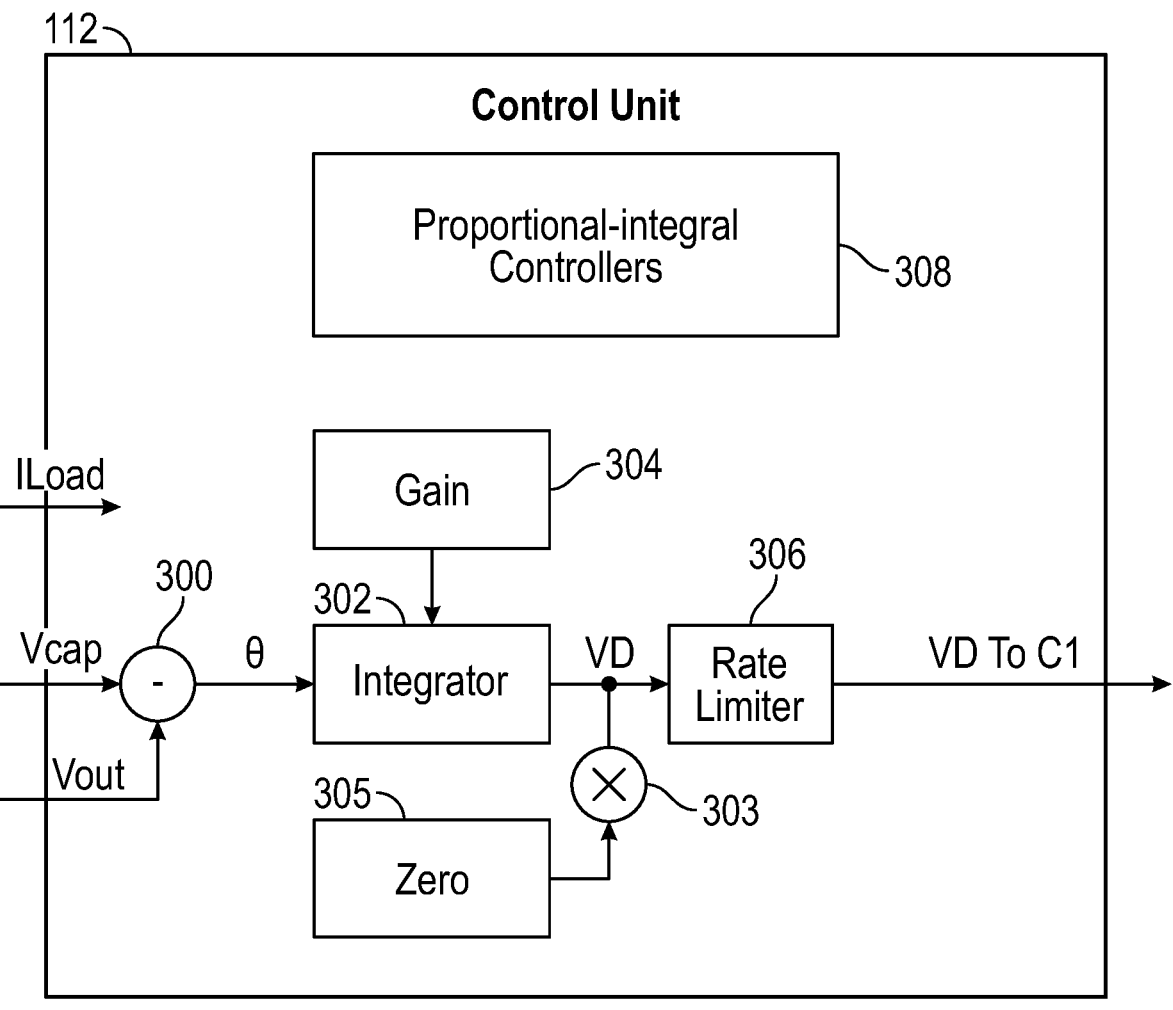
FIG. 3

Figure 5:
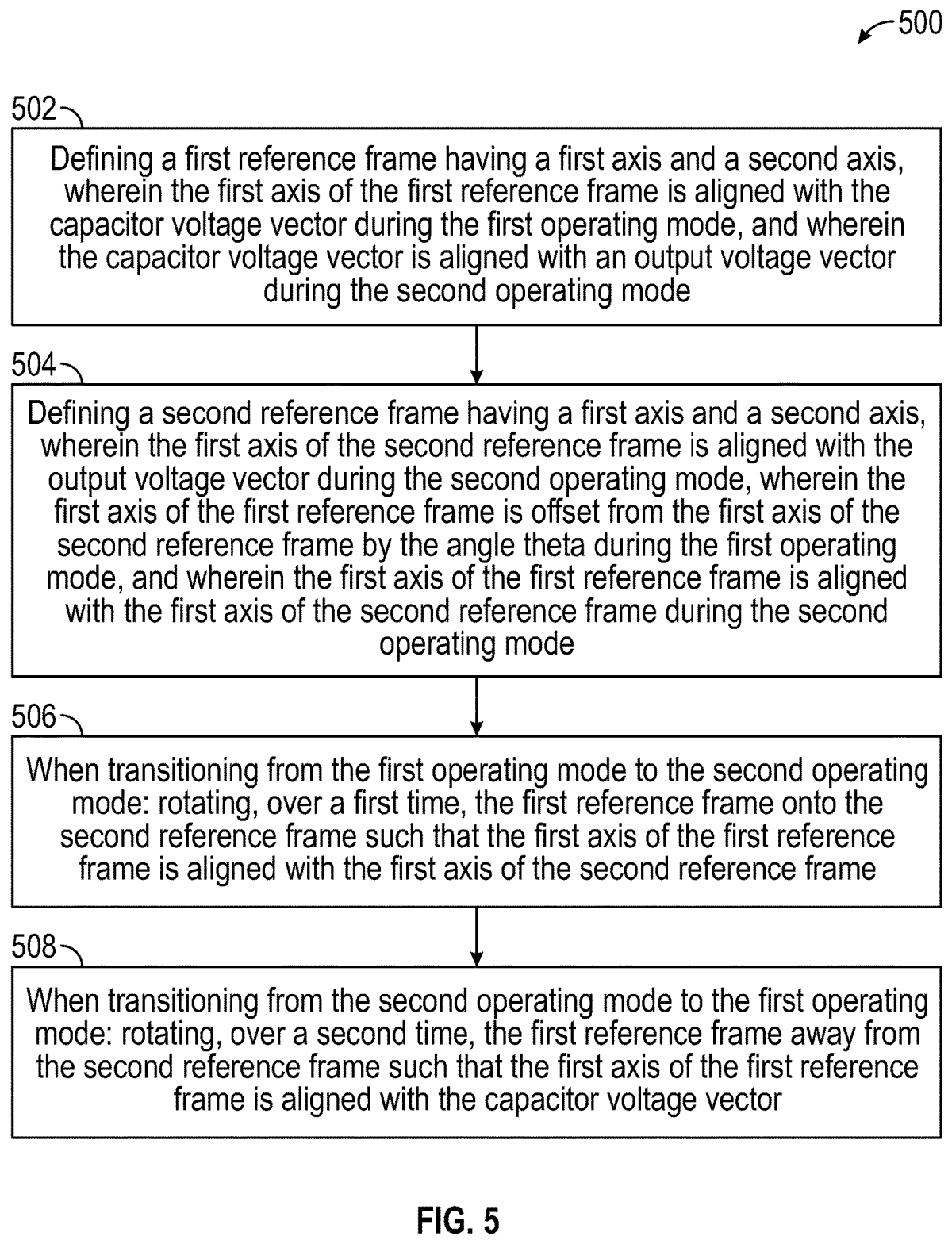

500

502

Defining a first reference frame having a first axis and a second axis, wherein the first axis of the first reference frame is aligned with the capacitor voltage vector during the first operating mode, and wherein the capacitor voltage vector is aligned with an output voltage vector during the second operating mode

504

Defining a second reference frame having a first axis and a second axis, wherein the first axis of the second reference frame is aligned with the output voltage vector during the second operating mode, wherein the first axis of the first reference frame is offset from the first axis of the second reference frame by the angle theta during the first operating mode, and wherein the first axis of the first reference frame is aligned with the first axis of the second reference frame during the second operating mode

506

When transitioning from the first operating mode to the second operating mode: rotating, over a first time, the first reference frame onto the second reference frame such that the first axis of the first reference frame is aligned with the first axis of the second reference frame

508

When transitioning from the second operating mode to the first operating mode: rotating, over a second time, the first reference frame away from the second reference frame such that the first axis of the first reference frame is aligned with the capacitor voltage vector

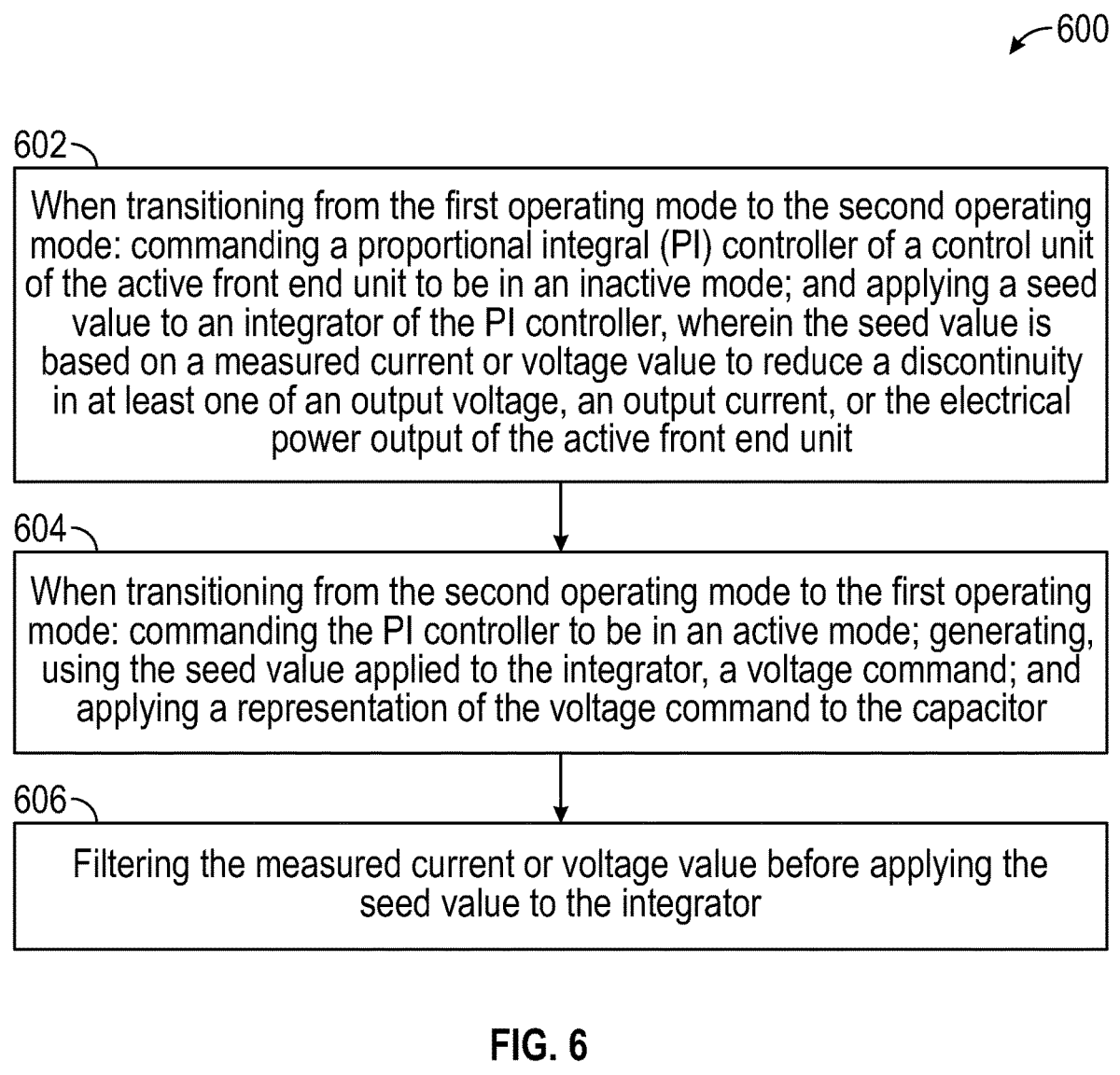

When transitioning from the first operating mode to the second operating mode: commanding a proportional integral (PI) controller of a control unit of the active front end unit to be in an inactive mode; and applying a seed value to an integrator of the PI controller, wherein the seed value is based on a measured current or voltage value to reduce a discontinuity in at least one of an output voltage, an output current, or the electrical power output of the active front end unit

604

When transitioning from the second operating mode to the first operating mode: commanding the PI controller to be in an active mode; generating, using the seed value applied to the integrator, a voltage command; and applying a representation of the voltage command to the capacitor

606

Filtering the measured current or voltage value before applying the seed value to the integrator

FIG. 6

TECHNIQUES FOR TRANSITIONING BETWEEN CONTROL MODES OF AN ACTIVE FRONT END UNIT

TECHNICAL FIELD

This document relates generally to electrical power equipment and more specifically to an energy storage system inverter apparatus.

BACKGROUND

Using various operating modes, a control unit of an active front end unit can service a grid, e.g., electrical grid or microgrid, which is equipped with gas or diesel gensets. The operating modes include a current control operating mode, a voltage control operating mode, and a frequency control operating mode. Transitioning between different operating modes can be needed to meet changing requirements of a system connected to an electrical grid, for example, gensets can be on or off.

U.S. Pat. No. 9,893,523 discloses systems, methods and apparatus for controlling an energy delivery system including providing an energy management system (EMS) having an automatic generation control (AGC) system including a load frequency control (LFC) module and an economic dispatch (ED) module; determining a regulation requirement based upon a predefined set of nested system control zones and a current area control error (ACE); determining regulation allocation based on a pre-defined set of gain factors associated with the nested system control zones; and implementing corrections to the operation of the energy delivery system based upon solution results of the determined regulation allocation.

SUMMARY

This disclosure describes techniques to reduce discontinuities in power, for example, by controlling an electrical power output of an active front end unit during a transition between a first operating mode and a second operating mode. In some examples, to reduce discontinuities, a control unit of the active front end unit can seed the integrator of proportional-integral (PI) controllers that are brought online during the operating mode change with a value that represents the proper state of the current system, such as the measured or calculated value of the component the PI controller is controlling). In other examples, to reduce discontinuities, a control unit of the active front end unit can control reference frame alignment during a transition between a first operating mode and a second operating mode.

In an aspect, this disclosure is directed to an active front end unit including an inverter having an output coupled to a capacitor that is coupled to an electrical grid, wherein an output voltage vector is offset from a capacitor voltage vector by an angle theta defining an electrical power output, the active front end unit comprising: the inverter; and a control unit coupled to the inverter and configured to perform operations comprising: defining a first reference frame having a first axis and a second axis, wherein the first axis of the first reference frame is aligned with the capacitor voltage vector during a first operating mode, and wherein the first axis of the first reference frame is aligned with an output voltage vector during a second operating mode; defining a second reference frame having a first axis and a second axis, wherein the first axis of the second reference frame is aligned with the output voltage vector during the second operating mode, wherein the first axis of the first reference frame is offset from the first axis of the second reference frame by the angle theta during the first operating mode, and wherein the first axis of the first reference frame is aligned with the first axis of the second reference frame during the second operating mode; when transitioning from the first operating mode to the second operating mode: rotating, over a first time, the first reference frame onto the second reference frame such that the first axis of the first reference frame is aligned with the first axis of the second reference frame; and when transitioning from the second operating mode to the first operating mode: rotating, over a second time, the first reference frame away from the second reference frame such that the first axis of the first reference frame is aligned with the capacitor voltage vector.

In another aspect, this disclosure is directed to an active front end unit including an inverter having an output coupled to a capacitor that is coupled to an electrical grid, wherein an output voltage vector is offset from a capacitor voltage vector by an angle theta defining an electrical power output, the active front end unit comprising: the inverter; and a control unit coupled to the inverter and configured to perform operations comprising: when transitioning from a first operating mode to a second operating mode: commanding a proportional integral (PI) controller of a control unit of the active front end unit to be in an inactive mode; and applying a seed value to an integrator of the PI controller, wherein the seed value is based on a measured current or voltage value to reduce a discontinuity in at least one of an output voltage, an output current, or the electrical power output of the active front end unit.

In yet another aspect, this disclosure is directed to a method of controlling an electrical power output of an active front end unit during a transition between a first operating mode and a second operating mode, wherein the active front end unit has an inverter, wherein an output of the active front end unit is coupled to a capacitor that is coupled to an electrical grid, and wherein an output voltage vector is offset from a capacitor voltage vector by an angle theta defining the electrical power output, the method comprising: defining a first reference frame having a first axis and a second axis, wherein the first axis of the first reference frame is aligned with the capacitor voltage vector during the first operating mode, and wherein the first axis of the first reference frame is aligned with an output voltage vector during the second operating mode; defining a second reference frame having a first axis and a second axis, wherein the first axis of the second reference frame is aligned with the output voltage vector during the second operating mode, wherein the first axis of the first reference frame is offset from the first axis of the second reference frame by the angle theta during the first operating mode, and wherein the first axis of the first reference frame is aligned with the first axis of the second reference frame during the second operating mode; when transitioning from the first operating mode to the second operating mode: rotating, over a first time, the first reference frame onto the second reference frame such that the first axis of the first reference frame is aligned with the first axis of the second reference frame; and when transitioning from the second operating mode to the first operating mode: rotating, over a second time, the first reference frame away from the second reference frame such that the first axis of the first reference frame is aligned with the capacitor voltage vector.

BRIEF DESCRIPTION OF THE DRAWINGS

FIGS. 2A-2C are conceptual diagrams showing the relationship between a grid voltage vector and a capacitor voltage vector.

FIG. 3 is a simplified block of an example of a control unit of an active front end unit that can implement various techniques of this disclosure.

FIG. 5 is a flow diagram of an example of a method of controlling an electrical power output of an active front end unit during a transition between a first operating mode and a second operating mode.

FIG. 6 is a flow diagram of an example of another method of controlling an electrical power output of an active front end unit during a transition between a first operating mode and a second operating mode.

DETAILED DESCRIPTION

An active front end unit is a bidirectional power unit that can interface between a battery bank and an external component, such as a grid. Using various operating modes, a control unit of an active front end unit can service a grid, e.g., electrical grid or microgrid. The operating modes include a current control operating mode (following operating mode), a voltage control operating mode (firming operating mode), and a frequency control operating mode (forming operating mode). Transitioning between the different operating modes is needed to meet changing requirements of a system connected to an electrical grid.

The present inventors have recognized that transitioning between the operating modes can lead to discontinuities in power, for example, between the current state and desired state of the system when the operating mode transition occurs due to the required change in control architecture. These discontinuities can lead to disturbances in the power output of the system that are undesired.

This disclosure describes techniques to reduce discontinuities in power, for example, by controlling an electrical power output of an active front end unit during a transition between a first operating mode and a second operating mode. In some examples, to reduce discontinuities, a control unit of the active front end unit can seed the integrator of proportional-integral (PI) controllers that are brought online during the operating mode change with a value that represents the proper state of the current system, such as the measured or calculated value of the component the PI controller is controlling). In other examples, to reduce discontinuities, a control unit of the active front end unit can control reference frame alignment during a transition between a first operating mode and a second operating mode.

Figure 1:
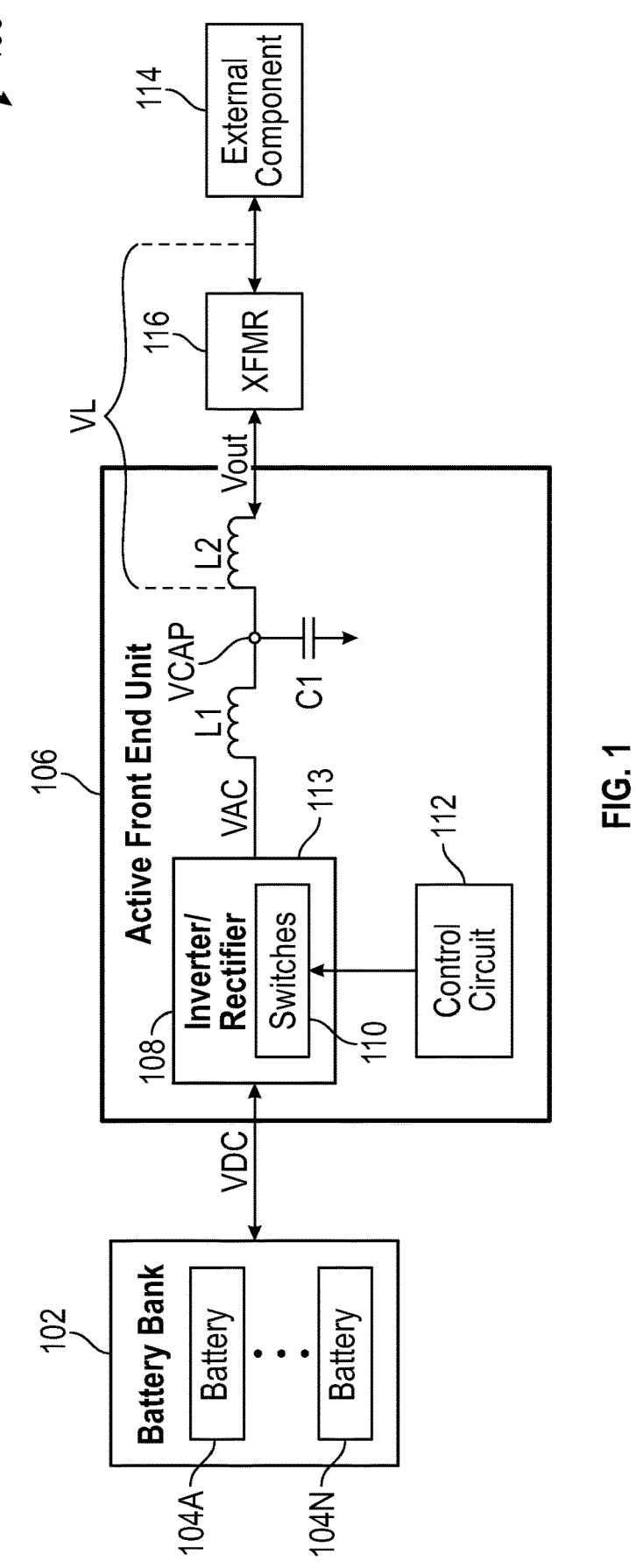
FIG. 1 is a simplified block diagram of an example of a system that can manage power transfer to an external component.

FIG. 1 is a simplified block diagram of an example of a system that can manage power transfer to an external component. The system 100 includes a battery bank 102 having a plurality of batteries 104A-104N, such as coupled in series with one another. The battery bank 102 can provide a DC voltage VDC to an active front end unit 106, which is a bidirectional power unit.

The active front end unit 106 includes an inverter/rectifier circuit 108 that receives the DC voltage VDC and, using a plurality of switches 110 controlled by a control unit 112, the inverter generates and outputs an AC voltage VAC via output 113. The output 113 of the inverter is coupled to a capacitor C1 that is coupled to an electrical grid. The AC voltage VAC can be applied to a filter circuit, such as including inductors L1, L2 and the capacitor C1. The control unit 112 can include one or more processors, controllers, field programable gate arrays (FPGA), or a combination thereof.

The active front end unit 106 can generate an output voltage VOUT that can be applied to an external component 114 via an optional transformer 116. In some embodiments, the external component 114 includes a grid (e.g., an electrical grid or a microgrid). In some embodiments, the external component 114 can include a motor or a generator. Supplying a DC voltage to the inverter/rectifier circuit 108 discharges the batteries 104A-104N in the battery bank 102.

In some examples, such as when the external component 114 is a grid, the active front end unit 106 can receive the AC voltage VAC. The inverter/rectifier circuit 108 can rectify the AC voltage VAC and generate a DC voltage VDC that can charge the batteries 104A-104N in the battery bank 102.

Using various operating modes, the control unit 112 of the active front end unit 106 can service the grid 114. In a following operating mode, the active front end unit 106 can sink or source current. In the following operating mode, the voltage is not controlled by the active front end unit but by the external component. The following operating mode directly controls real and reactive power by controlling different portions of the current vector.

In a firming operating mode, the active front end unit 106 acts as a voltage source and controls the voltage at an internal node of the system, such as the voltage of the capacitor C1. The firming operating mode directly controls real and reactive power by controlling different portions of the voltage vector.

The following operating mode or firming operating mode techniques use a part of the current or voltage vector, respectively, and controlling a magnitude of that portion of the vector directly provides the power requested.

In a forming operating mode, the active front end unit 106 can use frequency droop techniques to regulate the real power and voltage droop techniques to regulate the output voltage VOUT and regulate the reactive power. The active front end unit 106 applies real power by drooping up or down the frequency, which causes a phase difference θ between the voltage across the capacitor C1 (VCAP) and the grid voltage VOUT (depicted in FIG. 2A). The phase difference θ causes power to flow in one direction or the other. The frequency droop technique of the forming operating mode provides an indirect way of controlling real power. With the frequency droop technique, the active front end unit 106 indirectly controls power by controlling the frequency by allowing the voltage frequency to move up or down to change power flow.

This disclosure describes, among other things, techniques to control an electrical power output of an active front end unit during a transition between a first operating mode and a second operating mode, where the active front end unit has an inverter, where an output of the active front end unit is coupled to a capacitor that is coupled to an electrical grid, and where an output voltage vector is offset from a capacitor voltage vector by an angle theta defining the electrical power output.

FIGS. 2A-2C are conceptual diagrams showing the relationship between a grid voltage vector and a capacitor voltage vector. The grid voltage vector VOUT and the capacitor voltage vector VCAP are voltages at two different voltage nodes in the system. The grid voltage vector VOUT and the capacitor voltage vector VCAP are 3-phase voltages that can be converted to a D-Q rotating reference frame, as shown in FIG. 2A, such as by using a D-Q transform. The D-Q reference frame includes axes D, Q. It should be noted that the inverter current is a 3-phase current and can be converted to the D-Q rotating reference frame.

An angle θ is formed between the grid voltage vector VOUT, which is an output voltage vector, and the capacitor voltage vector VCAP. The angle θ between the two vectors controls real power and the relative sizing controls reactive power. If the two voltages are the same, the angle θ is zero and no power flows. Power flow increases as the angle θ between the grid voltage vector VOUT and the capacitor voltage vector VCAP increases. As such, the angle θ defines the power output. The control unit 112 of FIG. 2 controls the relative size and orientation of the capacitor voltage vector VCAP with respect to the grid voltage vector VOUT to control real and reactive power.

FIG. 2B depicts a reference frame alignment of the capacitor voltage vector VCAP during a forming operating mode. In the forming operating mode, e.g., a frequency droop control operating mode, the capacitor voltage vector VCAP is aligned with or tied to the Q axis of the D-Q reference frame. As such, the capacitor voltage vector VCAP does not include a D component in the forming operating mode. That is, in the forming operating mode of FIG. 2B, the angle θ is non-zero and the D component $V_D$ of VCAP is zero. The grid voltage vector VOUT includes both a D component and a Q component in the forming operating mode. To control power in the forming operating mode, the control unit 112 increases or decreases frequency, which adjusts the angle θ between the grid voltage vector VOUT and the capacitor voltage vector VCAP.

FIG. 2C depicts a reference frame alignment of the grid voltage vector VOUT during the firming operating mode and the following operating mode. In the firming operating mode and the following operating mode, the grid voltage vector VOUT is aligned with or tied to the Q axis of the D-Q reference frame. As such, the grid voltage vector VOUT does not include a D component in the firming operating mode and the following operating mode. The capacitor voltage vector VCAP includes both a D component and a Q component in the firming operating mode and the following operating mode.

FIG. 3 is a simplified block of an example of a control unit of an active front end unit that can implement various techniques of this disclosure. The control unit 112 is configured to receive various inputs. For example, the control unit 112 receives representations, e.g., scaled versions, of several measured values, including the measured capacitor voltage vector VCAP (including its angle), the measured grid voltage vector VOUT (including its angle), and the measured load current $I_{LOAD}$, which can be measured using various techniques, such as using voltage or current transformers. The measured capacitor voltage vector VCAP and the measured grid voltage vector VOUT are applied to a difference circuit 300 to generate the angle θ, which is the angular difference between the reference frame of the forming operating mode of FIG. 2B and the reference frame of the firming operating mode or the following operating mode of FIG. 2C.

The output of the difference circuit 300, which is representation of the angle θ, can be applied to an integrator circuit 302. The integrator circuit 302 receives and integrates the angle θ to generate a voltage command to be applied to the capacitor C1 in FIG. 1. In particular, the integrator circuit 302 generates a voltage command representing the D component $V_D$ of the capacitor voltage vector VCAP to be applied to the capacitor C1 in FIG. 1.

In some examples, the control unit 112 includes a gain circuit 304 coupled to the integrator circuit 302 and configured to apply a gain factor to adjust a rate of the integration of the integrator circuit 302. The control unit 112 includes a selection switch 303 that can select between the output of a zero block 305 (similar to block 418 in FIG. 4) and the output of the integrator circuit 302. The selection is then fed into a rate limiter circuit 306. The rate limiter circuit 306 can gradually reduce the voltage command representing the D component $V_D$ of the capacitor voltage vector VCAP by rate limiting, such as when transitioning between operating modes.

The Q axis of the reference frame in FIG. 2B (forming operating mode) is offset from the Q axis of the reference frame in FIG. 2C (both the firming operating mode and the following operating mode) by the angle θ. However, when transitioning to either the firming operating mode or the following operating mode of FIG. 2C, the Q axis of the reference frame of FIG. 2B aligns with the Q axis of the reference frame of FIG. 2C.

In the firming operating mode and the following operating mode, the grid voltage vector VOUT is aligned with or tied to the Q axis. The control unit control unit 112 can control the capacitor voltage vector VCAP by controlling the D and Q components of VCAP, $V_D$ and $V_Q$. By controlling $V_D$, the control unit 112 can rotate VCAP to the right or left of VOUT, and by controlling $V_Q$, the control unit 112 can adjust VCAP to be greater or smaller than VOUT in terms of magnitude.

In both the firming operating mode and the following operating mode (FIG. 2C), a D component $V_D$ of VCAP is needed because the capacitor voltage vector VCAP in those operating modes includes both D and Q components. As such, for both the firming operating mode and the following operating mode, the control unit 112 can determine a D component $V_D$ of VCAP when transitioning from either of those operating modes to the forming operating mode.

Just before transitioning from the forming operating mode in FIG. 2B to either the firming operating mode or the following operating mode in FIG. 2C, the capacitor voltage vector VCAP was tied to the Q axis and the D component $V_D$ of VCAP was zero. But, when transitioning from the forming operating mode in FIG. 2B to either the firming operating mode or the following operating mode in FIG. 2C, the reference frame in FIG. 2B snaps into the reference frame in FIG. 2C. The control unit 112 effectively tries to instantaneously align the capacitor voltage vector VCAP with the grid voltage vector VOUT, e.g., an output voltage vector, which pulls the capacitor voltage vector VCAP into the grid voltage vector VOUT, thereby causing the power to collapse.

Using various techniques of this disclosure, when transitioning from the first operating mode to the second operating mode, the control unit 112 can gradually rotate, over a first time, the reference frame of the first operating mode, e.g., the reference frame of FIG. 2B, onto the reference frame of the second operating mode, e.g., the reference frame of FIG. 2C, such that the first axis of the reference frame of the first operating mode, e.g., the Q axis of FIG. 2B, is aligned with the first axis of the reference frame of the second operating mode, e.g., the Q axis of FIG. 2C. As such, the control unit 112 gradually rotates the first reference frame onto the second reference frame over a tunable first time, e.g., where the first time is greater than 0. The first time typically lasts a few seconds and is typically less than 10 seconds, to prevent the rotation from pulling the capacitor voltage vector VCAP into the grid voltage vector VOUT and collapsing the power. The D component $V_D$ of VCAP is automatically adjusted. In this manner, the capacitor voltage vector VCAP and the grid voltage vector VOUT are left unchanged relative to one another, including their magnitude and the angle θ.

In some examples, to gradually rotate, over a first time, the reference frame of the first operating mode, e.g., the reference frame of FIG. 2B, onto the reference frame of the second operating mode, e.g., the reference frame of FIG. 2C, such that the first axis of the reference frame of the first operating mode, e.g., the Q axis of FIG. 2B, is aligned with the first axis of the reference frame of the second operating mode, the control unit 112 can use the integrator circuit 302 to perform an integration of the angle θ (the difference between the two reference frames) over the first time during which the angle θ changes to generate a voltage command $V_D$. For example, the integrator circuit 302 can perform the integration until the angle θ is zero, thereby indicating alignment of the two reference frames. Then, the control unit 112 can apply the representation of the voltage command $V_D$ to the capacitor, e.g., the capacitor C1 of FIG. 1. In some examples, the control unit 112 can adjust the rate of the integration to control how gradual the first reference frame is rotated onto the second reference frame. For example, the control unit 112 can use the gain circuit 304 to apply a gain factor to the integrator circuit 302 to adjust a rate of the integration, e.g., slow down the rate of integration. In some examples, the gain factor is a constant.

Just before transitioning from either the firming operating mode or the following operating mode in FIG. 2C to the forming operating mode in FIG. 2B, the reference frame of the first operating mode, e.g., the reference frame of FIG. 2B, starts from the grid voltage vector VOUT. When transitioning from either the firming operating mode or the following operating mode in FIG. 2C to the forming operating mode in FIG. 2B, the D component $V_D$ of VCAP snaps to zero, which effectively tries to instantaneously align the capacitor voltage vector VCAP with the grid voltage vector VOUT, e.g., an output voltage vector, which pulls the capacitor voltage vector VCAP into the grid voltage vector VOUT, thereby causing the power to collapse.

Using various techniques of this disclosure, when transitioning from the second operating mode to the first operating mode, the control unit 112 can gradually rotate, over a second time, the reference frame of the first operating mode, e.g., the reference frame of FIG. 2B, away from the reference frame of the second operating mode, e.g., the reference frame of FIG. 2C, such that the first axis of the first reference frame, e.g., the Q axis of FIG. 2B, is aligned with the capacitor voltage vector VCAP. The control unit 112 gradually rotates the reference over a tunable second time, e.g., where the second time is greater than 0. The second time typically lasts a few seconds and is typically less than 10 seconds, to prevent the rotation from pulling the capacitor voltage vector VCAP into the grid voltage vector VOUT and collapsing the power. In this manner, the capacitor voltage vector VCAP and the grid voltage vector VOUT are left unchanged relative to one another, including their magnitude and the angle θ.

In some examples, to gradually rotate, over a second time, the reference frame of the first operating mode, e.g., the reference frame of FIG. 2B, away from the reference frame of the second operating mode, e.g., the reference frame of FIG. 2C, such that the first axis of the first reference frame, e.g., the Q axis of FIG. 2B, is aligned with the capacitor voltage vector VCAP, the control unit 112 can gradually decrease, over the second time, the D component $V_D$ of the capacitor voltage vector VCAP to zero with respect to the first reference frame. For example, the control unit 112 can gradually reduce the D component $V_D$ of the capacitor voltage vector VCAP to zero by using the rate limiter circuit 306. Then, the control unit 112 can apply a representation of the voltage command $V_D$ to the capacitor, e.g., the capacitor C1 of FIG. 2.

In this manner, the control unit of an active front end unit, such as the control unit 112 of the active front end unit 106 of FIG. 1, can control reference frame alignment during a transition between a first operating mode and a second operating mode of the active front end unit to reduce power discontinuities.

Additionally or alternatively, the control unit of the active front end unit can reduce power discontinuities by controlling an electrical power output of the active front end unit during a transition between a first operating mode and a second operating mode. As described below, in some examples, to reduce power discontinuities, a control unit of the active front end unit, such as the control unit 112 of the active front end unit 106 of FIG. 1, can seed the integrator of the proportional-integral (PI) controllers 308 of FIG. 3, shown in more detail in FIG. 4, that are brought online during the operating mode change with a value that represents the proper state of the current system, such as the measured or calculated value, e.g., a filtered value, of the component the PI controller is controlling.

Figure 4:
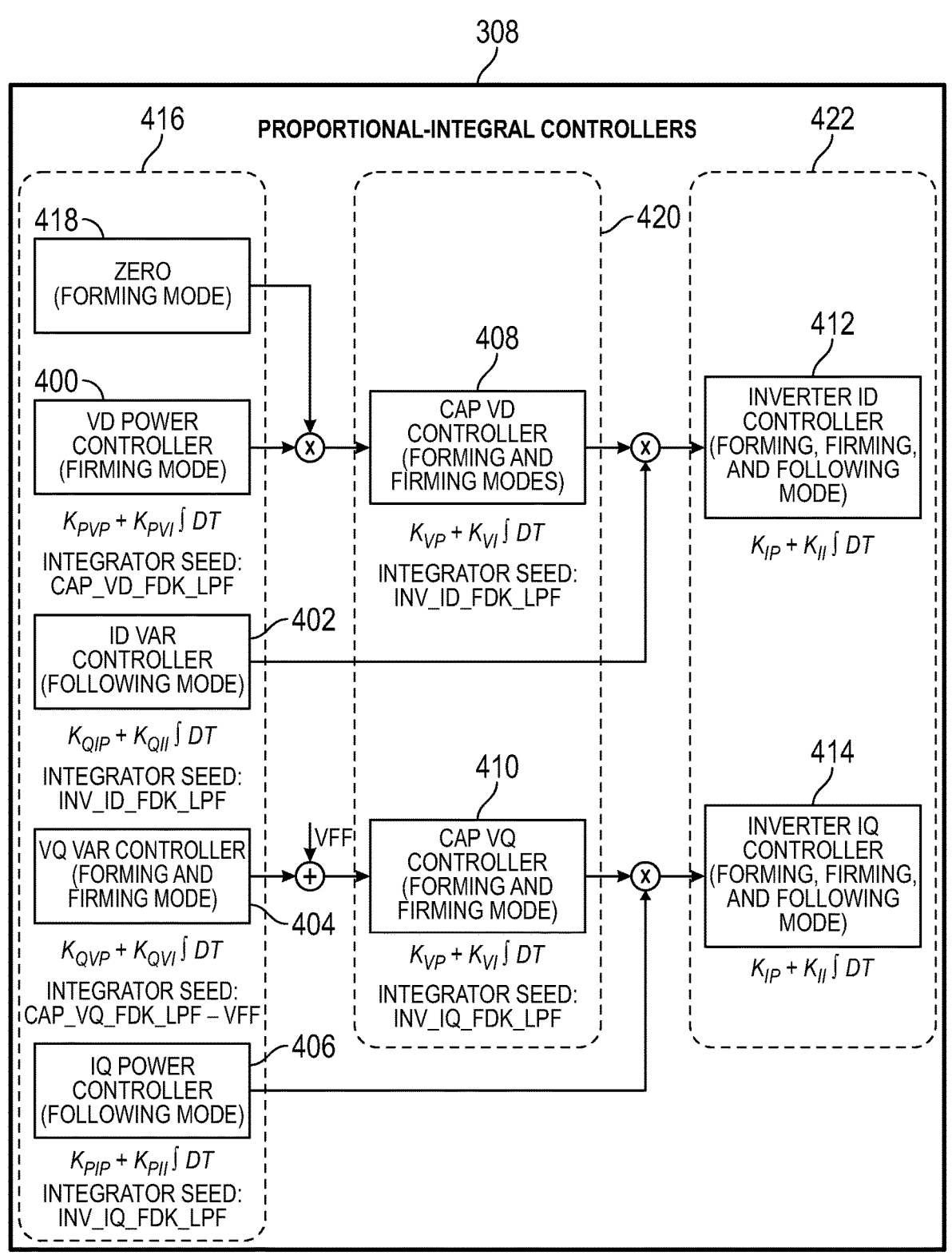
FIG. 4 is a simplified block of an example of the proportional-integral controllers of FIG. 3 that can implement various techniques of this disclosure.

FIG. 4 is a simplified block of an example of the proportional-integral (PI) controllers 308 of FIG. 3 that can implement various techniques of this disclosure. Various PI controllers 400-406 are depicted in box 416. The PI controllers 400-406 in box 416 represent controllers that output commands. In the forming operating mode, the D component $V_D$ is explicitly zero and, as such, no PI controller is needed, as depicted at block 418. The PI controllers 408 and 410 in box 420 represent capacitor voltage regulators for controlling the D component $V_D$ and the Q component $V_Q$, respectively, of the capacitor voltage vector VCAP applied to the capacitor C1 of FIG. 1. The PI controllers 412 and 414 of box 422 represent current regulators for controlling the D component $I_D$ and the Q component $I_Q$, respectively.

Referring to box 416, in the forming operating mode, the D component $V_D$ is explicitly zero as shown at block 418 and in the firming operating mode, the D component $V_D$ is generated using the controller 400. Depending on whether the control unit is in the forming operating mode or the firming operating mode, the output of block 418 or controller 400 is applied to the capacitor $V_D$ voltage controller 408.

In the following operating mode, the output of the $I_D$ controller 402 bypasses the capacitor $V_D$ voltage controller 408. In the forming operating mode and the firming operating mode, the control unit does not need the output of the $I_D$ VAR controller 402 and instead uses the capacitor $V_D$ voltage controller 408 to create a current regulator command to command the inverter $I_D$ controller 412.

In the forming operating mode, the capacitor $V_D$ voltage controller 408 does not control real power directly. Instead, the control unit controls real power via frequency droop techniques and $V_D$ is zero. In the firming operating mode, the control unit directly controls real power using the D component $V_D$.

In the forming operating mode and the firming operating mode, the output of the Q component $V_Q$ VAR controller 404 is applied along with a voltage VFF to the capacitor $V_Q$ voltage controller 410, where the voltage VFF can be a nominal grid voltage.

In the following operating mode, the output of the $I_Q$ power controller 406 bypasses the capacitor $V_Q$ voltage controller 410. In the forming operating mode and the firming operating mode, the control unit does not need the output of the $I_Q$ power controller 406 and instead uses the capacitor $V_Q$ voltage controller 404 to create a current regulator command to command the inverter $I_Q$ controller 414.

PI controllers can be modelled using a proportional (P) gain term $K_P$ summed with an integral (I) gain term $K_1 \int dt$. The proportional gain term $K_P$ is proportional to the current value of the difference (or error) between a setpoint value and a feedback or measured value. The integral gain term $K_1 \int dt$ integrates the past values of the difference (or error) between a setpoint value and a feedback or measured value over time.

Depending on the operating mode, some of the PI controllers in FIG. 4 are active, while other PI controllers are inactive. If a PI controller is reset to zero while inactive, then it will start from zero when it becomes active with mode changes, causing discontinuities in voltage, current, and power. The present inventors have recognized that by applying a seed value (or reset value) to an integrator of a PI controller of the active front end unit, where the seed value is based on a measured current or voltage value, the PI controller will not start from zero after an operating mode transition. Instead, the PI controller will have a reset value equal to the applied seed value, which can reduce or eliminate the discontinuities in at least one of an output voltage, an output current, or the electrical power output of the active front end unit. For example, when the controller of the active front end unit is inactive during the first operating mode, e.g., the forming mode, or the second operating mode, e.g., the firming or following mode, it can be desirable to apply the seed value to the integrator of the PI controller of the control unit 112 of the active front end unit 106.

The capacitor $V_D$ power controller 400 has two inputs: Input1=Real Power Command and Input2=Real Power Feedback (Measured). The error is represented by Err=Input1−Input2=Command −Measured. The output of the capacitor $V_D$ power controller 400 is represented as Output=−(KPVP*ERR+KPVI*∫ ERR dt), where KPVP and KPVI are proportional and integral gain constants, respectively, and where the Output is the capacitor $V_D$ command. In accordance with this disclosure, the integrator can be seeded with a capacitor $V_D$ voltage feedback value (measured) to prevent various discontinuities in at least one of the output voltage, the output current, or the electrical power output of the active front end unit. In some examples, it can be desirable to filter the measured value before applying the seed value the integrator, such as using low pass filter.

The $I_D$ VAR controller 402 has two inputs: Input1=Reactive Power Command and Input2=Reactive Power Feedback (Measured). The error is represented by Err=Input1−Input2=Command −Measured. The output of the $I_D$ VAR controller 402 is represented as Output= (KQIP*ERR+KQII*∫ ERR dt), where KQIP and KQII are proportional and integral gain constants, respectively, and where the Output is the inverter $I_D$ command. In accordance with this disclosure, the integrator can be seeded with an inverter $I_D$ current feedback value (measured) to prevent various discontinuities in at least one of the output voltage, the output current, or the electrical power output of the active front end unit. In some examples, it can be desirable to filter the measured value before applying the seed value the integrator, such as using low pass filter.

The capacitor $V_Q$ VAR controller 404 has two inputs: Input1=Reactive Power Command and Input2=Reactive Power Feedback (Measured). The error is represented by Err=Input1−Input2=Command −Measured. The output of the capacitor $V_Q$ VAR controller 404 is represented as Output=(KQVP*ERR+KQVI*∫ ERR dt), where KQVP and KQVI are proportional and integral gain constants, respectively, and where the Output plus the voltage VFF is the capacitor $V_Q$ command. In accordance with this disclosure, the integrator can be seeded with a capacitor $V_Q$ voltage feedback value (measured) to prevent various discontinuities in at least one of the output voltage, the output current, or the electrical power output of the active front end unit. In some examples, it can be desirable to filter the measured value before applying the seed value the integrator, such as using low pass filter.

The $I_Q$ power controller 406 has two inputs: Input1=Real Power Command and Input2=Real Power Feedback (Measured). The error is represented by Err=Input1−Input2=Command −Measured. The output of the $I_Q$ power controller 406 is represented as Output=(KPIP*ERR+KPII*∫ ERR dt), where KPIP and KPII are proportional and integral gain constants, respectively, and where the Output is the inverter $I_Q$ command. In accordance with this disclosure, the integrator can be seeded with an inverter $I_Q$ current feedback value (measured) to prevent various discontinuities in at least one of the output voltage, the output current, or the electrical power output of the active front end unit. In some examples, it can be desirable to filter the measured value before applying the seed value the integrator, such as using low pass filter.

The capacitor $V_D$ controller 408 has two inputs: Input1=Capacitor $V_D$ Command and Input2=Capacitor $V_D$ Command Feedback (Measured). The error is represented by Err=Input1−Input2=Command −Measured. The output of the capacitor $V_D$ controller 408 is represented as Output= (KVP*ERR+KVI*∫ ERR dt), where KVP and KVI are proportional and integral gain constants, respectively, and where the Output is the inverter $I_D$ command. In accordance with this disclosure, the integrator can be seeded with an inverter $I_D$ current feedback value (measured) to prevent various discontinuities in at least one of the output voltage, the output current, or the electrical power output of the active front end unit. In some examples, it can be desirable to filter the measured value before applying the seed value the integrator, such as using low pass filter.

The capacitor $V_Q$ controller 410 has two inputs: Input1=Capacitor $V_Q$ Command and Input2=Capacitor $V_Q$ Command Feedback (Measured). The error is represented by Err=Input1−Input2=Command −Measured. The output of the capacitor $V_Q$ controller 410 is represented as Output= (KVP*ERR+KVI*∫ ERR dt), where KVP and KVI are proportional and integral gain constants, respectively, and where the Output is the inverter $I_Q$ command. In accordance with this disclosure, the integrator can be seeded with an inverter $I_Q$ current feedback value (measured) to prevent various discontinuities in at least one of the output voltage, the output current, or the electrical power output of the active front end unit. In some examples, it can be desirable to filter the measured value before applying the seed value the integrator, such as using low pass filter.

FIG. 5 is a flow diagram of an example of a method 500 of controlling an electrical power output of an active front end unit during a transition between a first operating mode and a second operating mode, wherein the active front end unit has an inverter, where an output of the active front end unit is coupled to a capacitor that is coupled to an electrical grid, and where an output voltage vector is offset from a capacitor voltage vector by an angle theta defining the electrical power output.

A control unit, such as the control unit 112, can perform various operations, such as shown in blocks 502-508 of the method 500. At block 502, the method 500 includes defining a first reference frame having a first axis and a second axis, where the first axis of the first reference frame is aligned with the capacitor voltage vector during the first operating mode, and where the first axis of the first reference frame is aligned with an output voltage vector during the second operating mode. In some examples, the first operating mode is a frequency droop control operating mode, such as the forming mode.

At block 504, the method 500 includes defining a second reference frame having a first axis and a second axis, where the first axis of the second reference frame is aligned with the output voltage vector during the second operating mode, where the first axis of the first reference frame is offset from the first axis of the second reference frame by the angle theta during the first operating mode, and where the first axis of the first reference frame is aligned with the first axis of the second reference frame during the second operating mode.

At block 506, when transitioning from the first operating mode, e.g., the forming operating mode, to the second operating mode, e.g., the firming operating mode or the following operation mode, the method 500 includes gradually rotating, over a first time, the first reference frame onto the second reference frame such that the first axis of the first reference frame is aligned with the first axis of the second reference frame. In some examples, gradually rotating, over the first time, the first reference frame onto the second reference frame such that the first axis of the first reference frame is aligned with the first axis of the second reference frame includes performing an integration of the angle theta over the first time during which the angle theta changes to generate a voltage command and applying a representation of the voltage command to the capacitor, such as the capacitor C1 of FIG. 1. In some examples, the method 500 includes applying a gain factor to adjust a rate of the integration.

At block 508, when transitioning from the second operating mode, e.g., the firming operating mode or the following operation mode, to the first operating mode, e.g., the forming operating mode, the method 500 includes gradually rotating, over a second time, the first reference frame away from the second reference frame such that the first axis of the first reference frame is aligned with the capacitor voltage vector. In some examples, gradually rotating, over the second time, the first reference frame away from the second reference frame such that the first axis of the first reference frame is aligned with the capacitor voltage vector includes decreasing, over the second time, a component of the capacitor voltage vector to zero, e.g., the $V_D$ component, with respect to the first reference frame and applying a representation of the component to the capacitor.

FIG. 6 is a flow diagram of an example of a method 600 of controlling an electrical power output of an active front end unit during a transition between a first operating mode and a second operating mode, where the active front end unit has an inverter, and where an output of the active front end unit is coupled to a capacitor that is coupled to an electrical grid. In some examples, the first operating mode is a frequency droop control mode.

A control unit, such as the control unit 112, can perform various operations, such as shown in blocks 602-606 of the method 600. At block 602, when transitioning from the first operating mode to the second operating mode, the method 600 includes commanding a proportional integral (PI) controller of a control unit of the active front end unit to be in an inactive mode, and applying a seed value to an integrator of the PI controller, where the seed value is based on a measured current or voltage value to reduce a discontinuity in at least one of an output voltage, an output current, or the electrical power output of the active front end unit At optional block 604, when transitioning from the second operating mode to the first operating mode, the method 600 includes commanding the PI controller to be in an active mode, generating, using the seed value applied to the integrator, a voltage command, and applying a representation of the voltage command to the capacitor.

At optional block 606, the method 600 includes filtering the measured current or voltage value before applying the seed value to the integrator, such as by using a low pass filter.

In some examples, the techniques of FIG. 6 can be used in combination with the techniques of FIG. 5.

INDUSTRIAL APPLICABILITY

An active front end unit is a bidirectional power unit that can interface between a battery bank and an external component, such as a grid. Using various operating modes, a control unit of an active front end unit can service a grid, e.g., electrical grid or microgrid which is equipped with gas or diesel gensets. The operating modes include a current control operating mode, a voltage control operating mode, and a frequency control operating mode. Transitioning between different operating modes can be needed to meet changing requirements of a system (for example, gensets can be on or off) connected to an electrical grid.

The present inventors have recognized that the operating mode transition can lead to discontinuities in power between the current state and desired state of the system when the operating mode transition occurs due to the required change in control architecture. These discontinuities can lead to disturbances in the power output of the system that are undesired.

This disclosure describes techniques to reduce discontinuities in power by controlling an electrical power output of an active front end unit during a transition between a first operating mode and a second operating mode.

The above detailed description is intended to be illustrative, and not restrictive. The scope of the disclosure should, therefore, be determined with references to the appended claims, along with the full scope of equivalents to which such claims are entitled.

The invention claimed is:

1. An active front end unit including an inverter having an output coupled to a capacitor that is coupled to an electrical grid, wherein an output voltage vector is offset from a capacitor voltage vector by an angle theta defining an electrical power output, the active front end unit comprising:
   the inverter; and
   a control unit coupled to the inverter and configured to perform operations comprising:
   defining a first reference frame having a first axis and a second axis, wherein the first axis of the first reference frame is aligned with the capacitor voltage vector during a first operating mode, and wherein the first axis of the first reference frame is aligned with the output voltage vector during a second operating mode;
   defining a second reference frame having a first axis and a second axis, wherein the first axis of the second reference frame is aligned with the output voltage vector during the second operating mode, wherein the first axis of the first reference frame is offset from the first axis of the second reference frame by the angle theta during the first operating mode, and wherein the first axis of the first reference frame is aligned with the first axis of the second reference frame during the second operating mode;

when transitioning from the first operating mode to the second operating mode: rotating, over a first time, the first reference frame onto the second reference frame such that the first axis of the first reference frame is aligned with the first axis of the second reference frame; and when transitioning from the second operating mode to the first operating mode: rotating, over a second time, the first reference frame away from the second reference frame such that the first axis of the first reference frame is aligned with the capacitor voltage vector.

2. The active front end unit of claim 1, wherein the operation of rotating, over the first time, the first reference frame onto the second reference frame such that the first axis of the first reference frame is aligned with the first axis of the second reference frame includes the operations of:

performing an integration of the angle theta over the first time during which the angle theta changes to generate a voltage command; and applying a representation of the voltage command to the capacitor.

3. The active front end unit of claim 1, wherein the control unit is further configured to perform the operation comprising:

applying a gain factor to adjust a rate of the integration.

4. The active front end unit of claim 1, wherein the operation of rotating, over the second time, the first reference frame away from the second reference frame such that the first axis of the first reference frame is aligned with the capacitor voltage vector includes the operations of:

decreasing, over the second time, a component of the capacitor voltage vector to zero with respect to the first reference frame; and applying a representation of the component to the capacitor.

5. The active front end unit of claim 1, wherein the first operating mode is a frequency droop control operating mode.

6. The active front end unit of claim 1, wherein the control unit is further configured to perform the operation comprising:

applying a seed value to an integrator of a proportional integral (PI) controller of a controller of the active front end unit, wherein the seed value is based on a measured current or voltage value to reduce a discontinuity in at least one of an output voltage, an output current, or the electrical power output of the active front end unit.

7. The active front end unit of claim 6, wherein the control unit is further configured to perform the operation comprising:

filtering the measured current or voltage value before applying the seed value to the integrator.

8. The active front end unit of claim 6, wherein the operation comprising applying the seed value to the integrator of the proportional integral (PI) controller of the controller of the active front end unit includes:

when the controller of the active front end unit is inactive during the first operating mode or the second operating mode: applying the seed value to the integrator of the proportional integral (PI) controller of the controller of the active front end unit.

9. A method of controlling an electrical power output of an active front end unit during a transition between a first operating mode and a second operating mode, wherein the active front end unit has an inverter, wherein an output of the active front end unit is coupled to a capacitor that is coupled to an electrical grid, and wherein an output voltage vector is offset from a capacitor voltage vector by an angle theta defining the electrical power output, the method comprising:

defining a first reference frame having a first axis and a second axis, wherein the first axis of the first reference frame is aligned with the capacitor voltage vector during the first operating mode, and wherein the first axis of the first reference frame is aligned with the output voltage vector during the second operating mode;

defining a second reference frame having a first axis and a second axis, wherein the first axis of the second reference frame is aligned with the output voltage vector during the second operating mode, wherein the first axis of the first reference frame is offset from the first axis of the second reference frame by the angle theta during the first operating mode, and wherein the first axis of the first reference frame is aligned with the first axis of the second reference frame during the second operating mode;

when transitioning from the first operating mode to the second operating mode: rotating, over a first time, the first reference frame onto the second reference frame such that the first axis of the first reference frame is aligned with the first axis of the second reference frame; and when transitioning from the second operating mode to the first operating mode: rotating, over a second time, the first reference frame away from the second reference frame such that the first axis of the first reference frame is aligned with the capacitor voltage vector.

10. The method of claim 9, wherein rotating, over the first time, the first reference frame onto the second reference frame such that the first axis of the first reference frame is aligned with the first axis of the second reference frame comprises:

performing an integration of the angle theta over the first time during which the angle theta changes to generate a voltage command; and applying a representation of the voltage command to the capacitor.

11. The method of claim 10, comprising:

applying a gain factor to adjust a rate of the integration.

12. The method of claim 9, wherein rotating, over the second time, the first reference frame away from the second reference frame such that the first axis of the first reference frame is aligned with the capacitor voltage vector comprises:

decreasing, over the second time, a component of the capacitor voltage vector to zero with respect to the first reference frame; and applying a representation of the component to the capacitor.

13. The method of claim 9, wherein the first operating mode is a frequency droop control operating mode.

14. The method of claim 9, comprising:

applying a seed value to an integrator of a proportional integral (PI) controller of a controller of the active front end unit, wherein the seed value is based on a measured current or voltage value to reduce a discontinuity in at least one of an output voltage, an output current, or the electrical power output of the active front end unit.

15. The method of claim 14, comprising:

filtering the measured current or voltage value before applying the seed value to the integrator.

16. The method of claim 14, wherein applying the seed value to the integrator of the proportional integral (PI) controller of the controller of the active front end unit comprises:

when the controller of the active front end unit is inactive during the first operating mode or the second operating mode: applying the seed value to the integrator of the proportional integral (PI) controller of the controller of the active front end unit.

* * * * *